US011227727B2

(12) United States Patent
Hsu et al.

(10) Patent No.: US 11,227,727 B2
(45) Date of Patent: Jan. 18, 2022

(54) KEY STRUCTURE

(71) Applicants: LITE-ON ELECTRONICS (GUANGZHOU) LIMITED, Guangzhou (CN); Lite-On Technology Corporation, Taipei (TW)

(72) Inventors: Kuo-Hui Hsu, Taipei (TW); Cheng-Kun Liao, Taipei (TW); Li-Sheng Hsiao, Taipei (TW); En-Huei Wang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/904,575

(22) Filed: Jun. 18, 2020

(65) Prior Publication Data
US 2020/0402736 A1    Dec. 24, 2020

Related U.S. Application Data

(60) Provisional application No. 62/863,251, filed on Jun. 18, 2019.

(30) Foreign Application Priority Data

May 7, 2020 (CN) .......................... 202010378052.8

(51) Int. Cl.
*H01H 3/12* (2006.01)
*H01H 13/14* (2006.01)
(Continued)

(52) U.S. Cl.
CPC ........... *H01H 3/125* (2013.01); *G02B 6/0036* (2013.01); *G02B 6/0055* (2013.01);
(Continued)

(58) Field of Classification Search
CPC ...... H01H 13/14; H01H 3/125; H01H 13/704; H01H 13/7065; G02B 6/0036; G02B 6/0055
(Continued)

(56) References Cited

U.S. PATENT DOCUMENTS

| 8,436,265 | B2 * | 5/2013 | Koike | .................... H01H 3/125 |
| | | | | 200/314 |
| 2008/0237012 | A1 | 10/2008 | Koike et al. | |
| 2019/0244773 | A1 * | 8/2019 | Zou | ...................... H01H 13/705 |

FOREIGN PATENT DOCUMENTS

| CN | 202796583 | 3/2013 |
| CN | 109767946 | 5/2019 |

OTHER PUBLICATIONS

"Office Action of China Counterpart Application", dated Nov. 3, 2021, p. 1-p. 8.

* cited by examiner

*Primary Examiner* — Edwin A. Leon
*Assistant Examiner* — Iman Malakooti
(74) *Attorney, Agent, or Firm* — JCIPRNET

(57) ABSTRACT

A key structure includes a keycap, a connection assembly, engaging members, and a base plate. The connection assembly disposed between the base plate and the keycap is movably connected to the keycap and the engaging members, so that the keycap and the connection assembly engaged with the engaging members are positioned on the base plate. The base plate includes engaging protrusions protruding from an upper surface, so that the engaging members are bonded to the base plate through the engaging protrusions. Each engaging protrusion is located between two openings of the base plate, connects the two openings, or is disposed corresponding to the openings. Each engaging member covers one or more engaging protrusions through
(Continued)

injection molding, and is fixed to the base plate. The engaging members are respectively disposed on the openings, fill the openings, or completely cover the engaging protrusions.

24 Claims, 8 Drawing Sheets

(51) Int. Cl.
*H01H 13/785* (2006.01)
*H01H 13/83* (2006.01)
*F21V 8/00* (2006.01)
*G06F 3/02* (2006.01)
*H01H 13/704* (2006.01)
*H01H 13/7057* (2006.01)
*H01H 13/705* (2006.01)

(52) U.S. Cl.
CPC ........... *G06F 3/0202* (2013.01); *H01H 13/14* (2013.01); *H01H 13/704* (2013.01); *H01H 13/705* (2013.01); *H01H 13/7057* (2013.01); *H01H 13/785* (2013.01); *H01H 13/83* (2013.01); *G02B 6/0073* (2013.01); *H01H 2203/052* (2013.01); *H01H 2219/039* (2013.01); *H01H 2221/058* (2013.01); *H01H 2229/044* (2013.01)

(58) Field of Classification Search
USPC ................................ 200/5 A, 341, 344, 345
See application file for complete search history.

KEY STRUCTURE

CROSS-REFERENCE TO RELATED APPLICATION

This application claims the priority benefits of U.S. provisional application Ser. No. 62/863,251, filed on Jun. 18, 2019, and China application serial no. 202010378052.8, filed on May 7, 2020. The entirety of each of the above-mentioned patent applications is hereby incorporated by reference here and made a part of this specification.

BACKGROUND

Technical Field

The disclosure relates to a key structure, and particularly relates to a key structure capable of fixing engaging members to a base plate through injection molding and effectively improving a connecting strength between the engaging members and the base plate.

Description of Related Art

In general, keyboards have become indispensable input devices for computers. Especially, in order to make a lighter or more compact portable computer without compromise on its lifetime, keyboard manufacturers need to develop a thin and durable key structure. A conventional key structure used in a keyboard often adopts a scissor-like structure to support a keycap, which can move up and down relative to a base plate in a specific direction. The conventional scissor-like structure has two supporting members that are interlocked in a "scissor-like" fashion, and each supporting member has a first end and a second end, where the first end is connected to the keycap, and the second end is connected to the base plate. After the base plate is stamped by a stamping press, positioning hooks may be formed on the base plate and used to hold or position the scissor-like structure. In more detail, the second ends of the two supporting members of the scissor-like structure are both connected to the positioning hooks on the base plate, where the second end can rotate or slide at a certain degree within the positioning hook. Therefore, when scissor-like structure keeps moving up and down as the user keeps typing on a keyboard, the positioning hooks, which are formed on the base plate and made by stamping the base plate material, are constantly impacted and/or pulled by the second ends of the scissor-like structure. So, if the connecting strength between the positioning hooks and the base plate are not strong enough, the positioning hooks that are constantly impacted and/or pulled are likely to break down or break away from the base plate, thus causing the second ends of the scissor-like structure to be unstable and further affecting the reliability and the lifetime of the key structure as well as the entire keyboard.

SUMMARY

The disclosure is directed to a key structure of a keyboard with good connecting strength and reliability.

An embodiment of the disclosure provides a key structure including a base plate, a first engaging member, a keycap, and a connection assembly. The base plate has an upper surface and a lower surface opposite to the upper surface, a first opening, a second opening, and a third opening, and the base plate includes a first engaging protrusion and a second engaging protrusion that are respectively extended from the upper surface. The first engaging protrusion is located between the first opening and the second opening, and the second engaging protrusion is located between the second opening and the third opening. The first engaging member covers the first engaging protrusion and the second engaging protrusion through injection molding, and is coupled to the first opening, the second opening, and the third opening. The keycap is disposed above the base plate. The connection assembly is disposed between the base plate and the keycap. One end of the connection assembly is movably connected to the keycap, and the other end of the connection assembly is movably connected to the first engaging member, so that the keycap is adapted to move up and down relative to the base plate with the connection assembly.

An embodiment of the disclosure provides a key structure including a base plate, a first engaging member, a second engaging member, a third engaging member, a fourth engaging member, a keycap, and a connection assembly. The base plate has a plurality of openings, an upper surface, and a lower surface opposite to the upper surface, and, and the base plate includes a plurality of engaging protrusions protruding from the upper surface. Each of the engaging protrusions is located between two of the openings, and the two openings communicate with each other through an accommodation under each of the engaging protrusions. The first engaging member and the second engaging member respectively cover at least two of the engaging protrusions through injection molding. The third engaging member and the fourth engaging member respectively cover one of the engaging protrusions through injection molding. The keycap is disposed above the base plate. The connection assembly is disposed between the base plate and the keycap. The connection assembly has a first supporting member and a second supporting member pivotally connected to each other. The first supporting member is located at an outer side of the second supporting member. A first end of the first supporting member is pivotally connected to the first engaging member and the second engaging member, and a second end of the first supporting member is pivotally connected to the keycap. A first end of the second supporting member is pivotally connected to the third engaging member and the fourth engaging member, and a second end of the second supporting member is pivotally connected to the keycap, so that the keycap is adapted to move up and down relative to the base plate with the connection assembly.

An embodiment of the disclosure provides a key structure including a base plate, a keycap, four engaging members, and a connection assembly. The keycap, the connection assembly, the engaging members, and the base plate are arranged in sequence from top to bottom, i.e., the connection assembly is disposed between the keycap and the base plate, the connection assembly is fixed to the base plate through the engaging members, and the keycap is adapted to move up and down relative to the base plate. The base plate has a plurality of openings, an upper surface, and a lower surface opposite to the upper surface, and the base plate includes a plurality of engaging protrusions respectively extended from the upper surface. The engaging protrusions are located between two openings of the base plate, and the two openings communicate with each other under the engaging protrusions. The engaging members respectively cover the corresponding engaging protrusions through injection molding to fix the engaging members to the base plate, i.e., the engaging members are arranged on or in the corresponding openings of the base plate. Here, the engaging members fill the corresponding openings and the engaging protrusions through injection molding, and encapsulate the engaging protrusions from top to bottom or from bottom to top, so as to enhance a bonding strength between the engaging members and the base plate.

In the key structure provided in the second embodiment of the disclosure, each of the engaging protrusions has a top surface and a bottom surface opposite to each other, where a contour of the bottom surface is different from a contour of the top surface. In addition, the key structure provided in one or more embodiments of the disclosure adopts the engaging protrusions protruding from the upper surface of the base plate, and the bottom surface of each of the engaging members is further aligned with the lower surface of the base plate to simultaneously achieve functions of increasing the durability of keys and reducing a thickness of an overall keyboard.

In the key structure of another embodiment of the disclosure, the openings include three first openings and three second openings arranged side by side and two third openings and two fourth openings arranged side by side. Two first engaging protrusions parallel with each other are respectively disposed between the three first openings, and two second engaging protrusions parallel with each other are respectively disposed between the three second openings, i.e., two engaging protrusions shaped as arch bridges are sandwiched between the three continuous openings, the three continuous openings communicate with one another under the two engaging protrusions, respectively, and the two engaging protrusions are alternately arranged, for example, obliquely aligned with an axis penetrating through the three continuous openings. The two third openings and the two fourth openings communicate with each other under the third engaging protrusion and the fourth engaging protrusion, respectively. The engaging protrusion may be shaped as an arch or a bridge, a bridge with holes, or a divided arch or bridge with disconnected protrusions to accommodate a plastic of the engaging members and enhance the bonding strength with the base plate.

In the key structure of still another embodiment of the disclosure, a first engaging portion is further defined through a mold design above the engaging members that encapsulate the two engaging protrusions (for example, the two first engaging protrusions parallel with each other) through injection molding, and a second engaging portion is further defined through the mold design above the engaging member encapsulating only one engaging protrusion (such as the third or fourth engaging protrusion). Here, the first engaging portion may be a retaining groove, and the second engaging portion may be a retaining hook, which serve to fix the connection assembly to the base plate and provide a degree of freedom of movement for the connection assembly to slide or rotate. For example, in the key structure provided in the disclosure, the connection assembly includes a first supporting member and a second supporting member that are pivotally cross-connected to each other, and each supporting member has a first end and a second end, wherein the first ends of the supporting members are respectively connected to the keycap, and the second ends are respectively connected to the first engaging portion and the second engaging portion. Further, if the first engaging portion is the retaining groove, and the second engaging portion is the retaining hook, the second end of the first supporting member may be coupled to the retaining groove and may be rotated freely, and the second end of the second supporting member may be set in the retaining hook and may slide left and right to a certain extent, so that the connection assembly supports the keycap to reciprocate up and down.

In an embodiment of the disclosure, the key structure may further include a membrane circuit board disposed between the keycap and the base plate. The membrane circuit board has a plurality of through holes corresponding to positions of the engaging members, so that the engaging members fixed to the base plate may pass through the through holes without being blocked by the membrane circuit board. The membrane circuit board has a switch, and the switch is triggered when the keycap is pressed.

In an embodiment of the disclosure, the key structure may further include an elastic component, which is positioned within an aperture confined by the connection assembly and is disposed between the keycap and the membrane circuit board. When the keycap is pressed and an external force disappears, the elastic component helps the keycap to return to its original position before pressing is conducted.

Based on the above description, several embodiments of disclosure provides a plurality of key structures, wherein a plurality of the engaging protrusions are disposed on the upper surface of the base plate, and the engaging members fill and cover one or more engaging protrusions through injection molding. The engaging protrusions could be configured with the proper arrangement, number and shape to increase the contact area between the engaging members and the engaging protrusions, and thus, the connecting strength between the engaging members and the base plate is enhanced. As such, the engaging members pulled by the connection assembly are prevented from being disengaged from the base plate, thereby improving the reliability and lifetime of the key structure.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
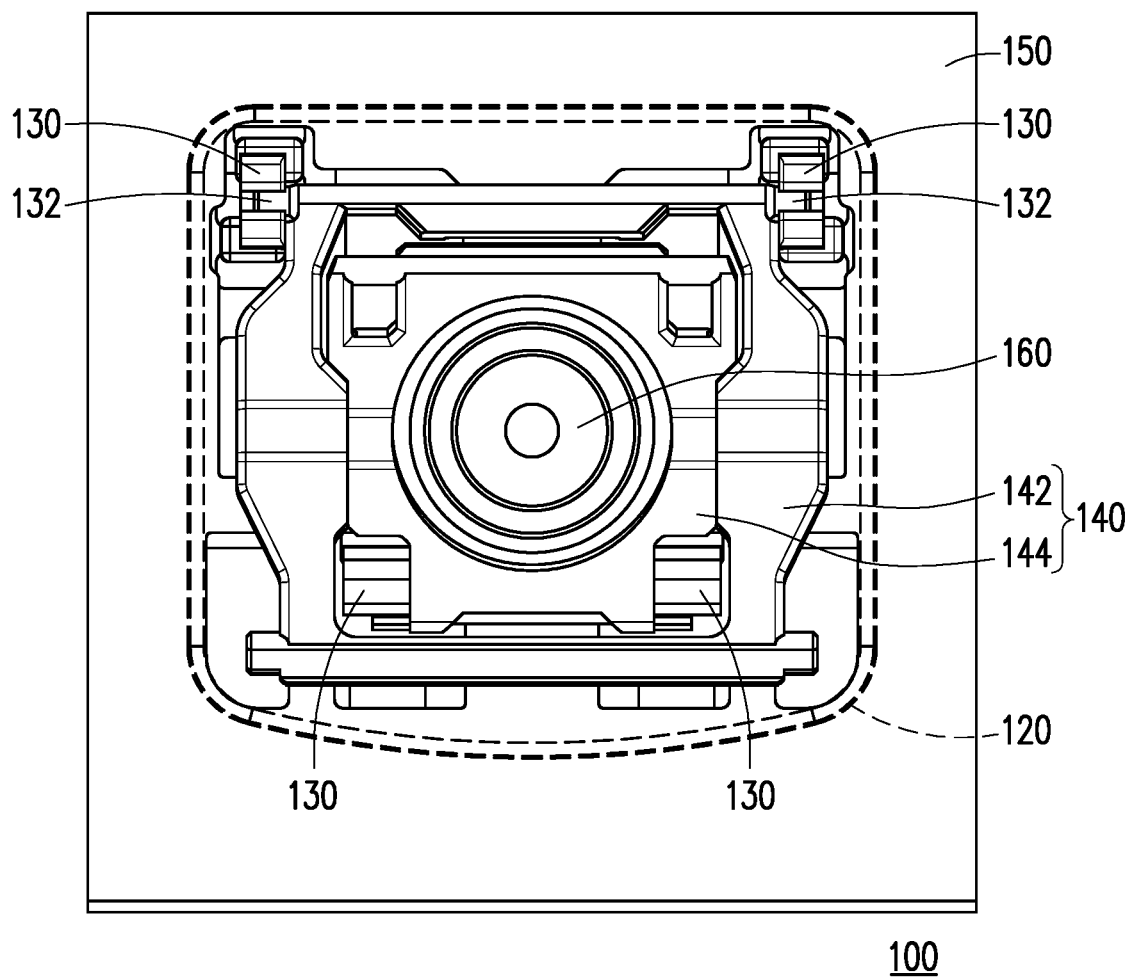
FIG. 1 is a schematic top view of a key structure according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2A:
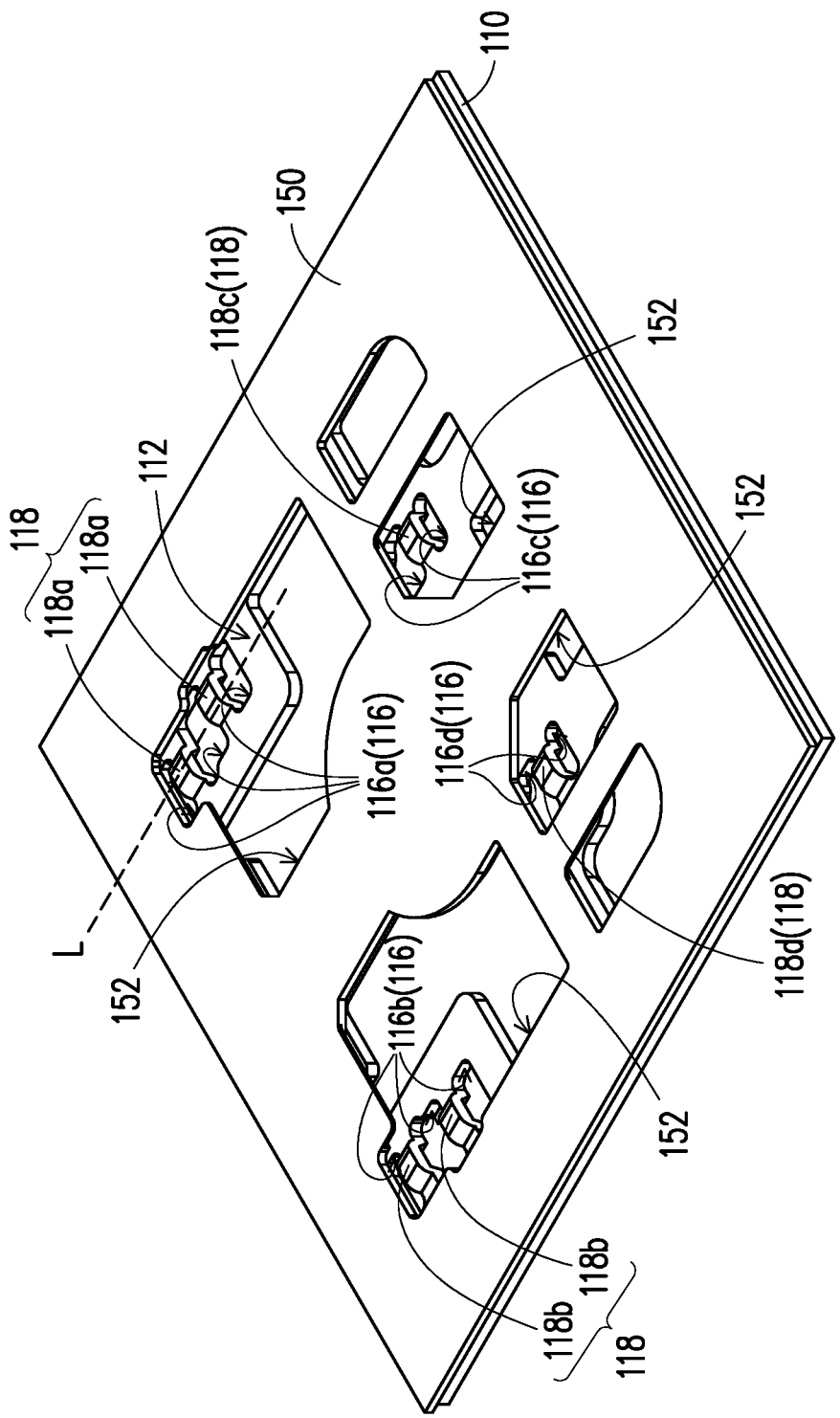
FIG. 2A is a schematic three-dimensional view of a base plate and a membrane circuit board of the key structure in FIG. 1.
Figure 2B:
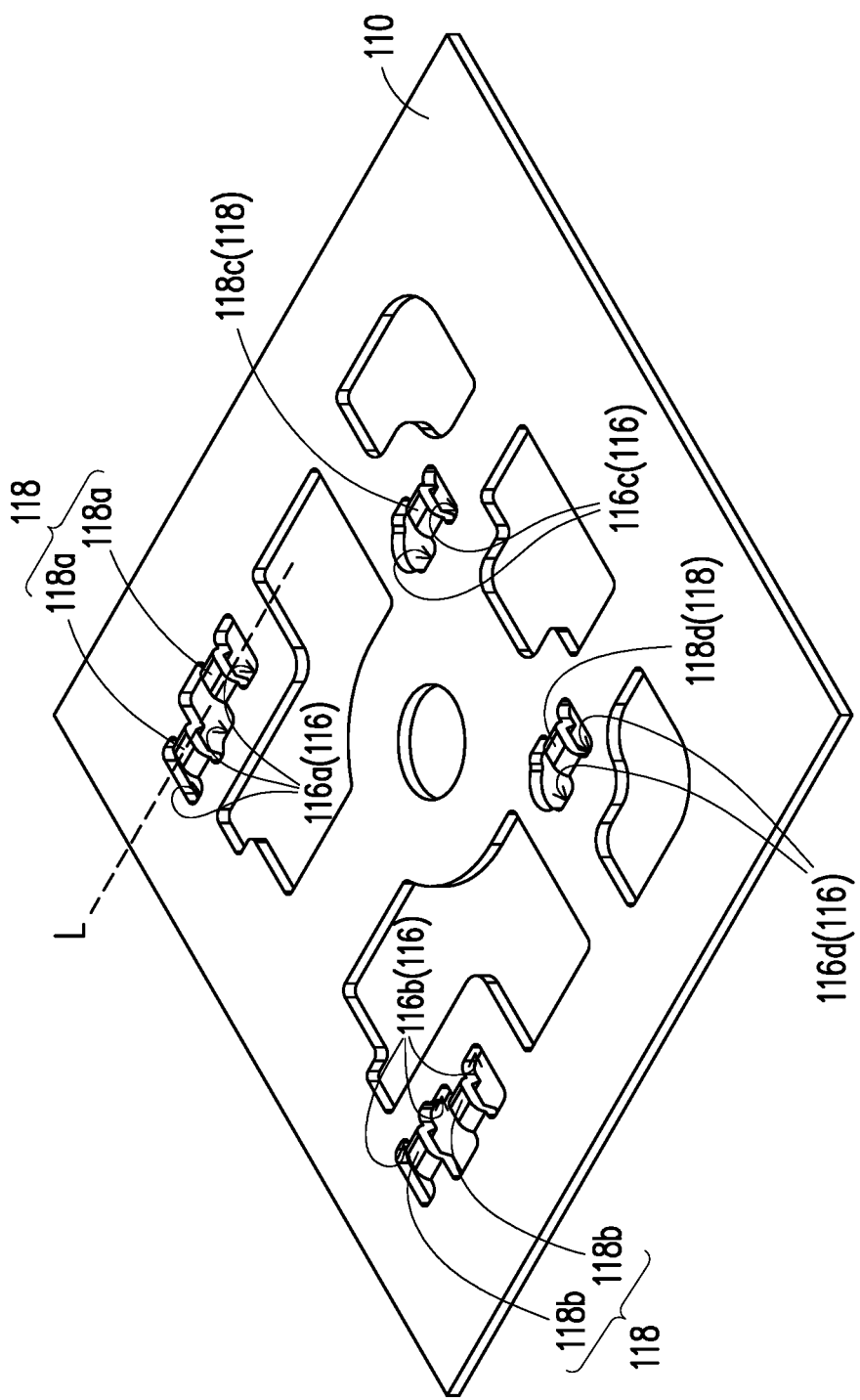
FIG. 2B is a schematic three-dimensional view of the base plate of the key structure in FIG. 2A.
Figure 3A:
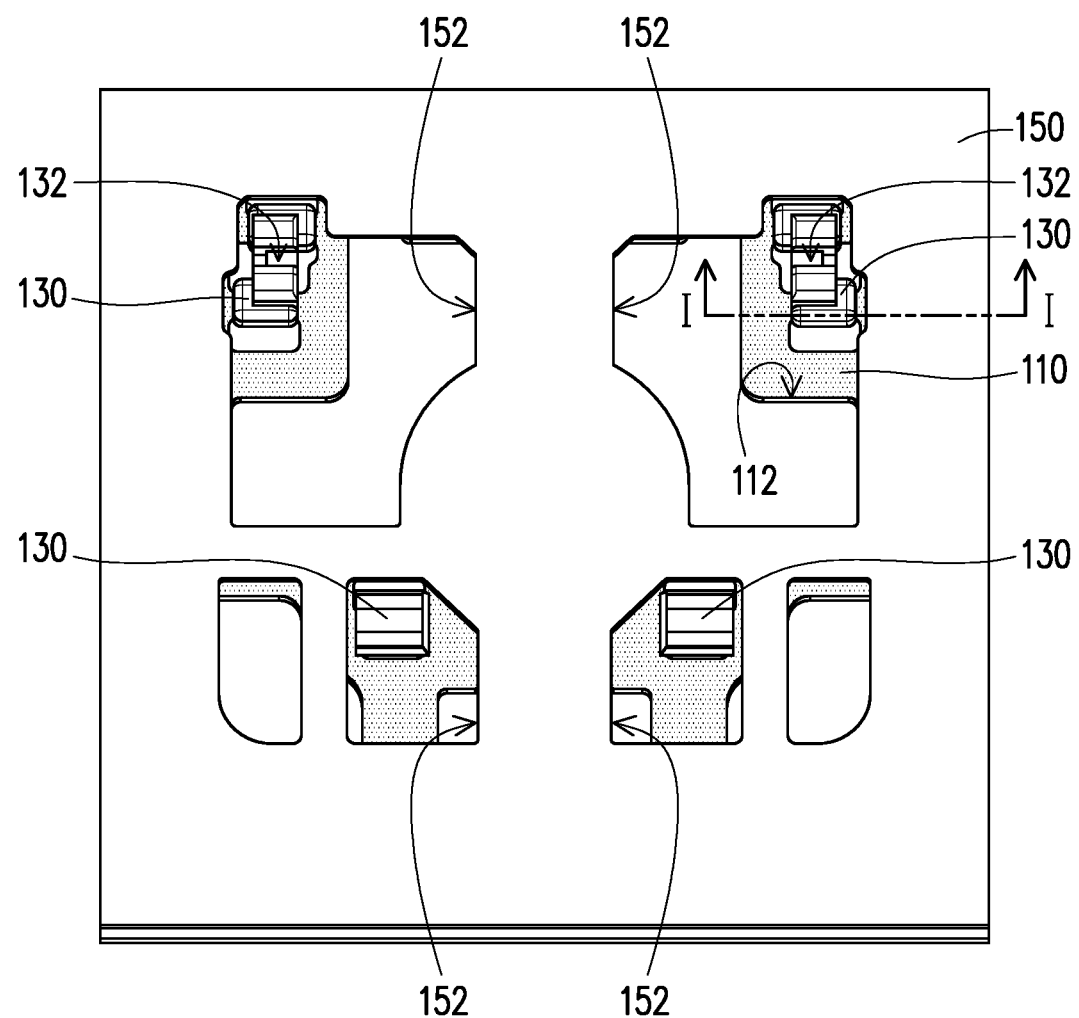
FIG. 3A is a schematic top view of the base plate, the membrane circuit board and engaging members of the key structure in FIG. 1.
Figure 3B:
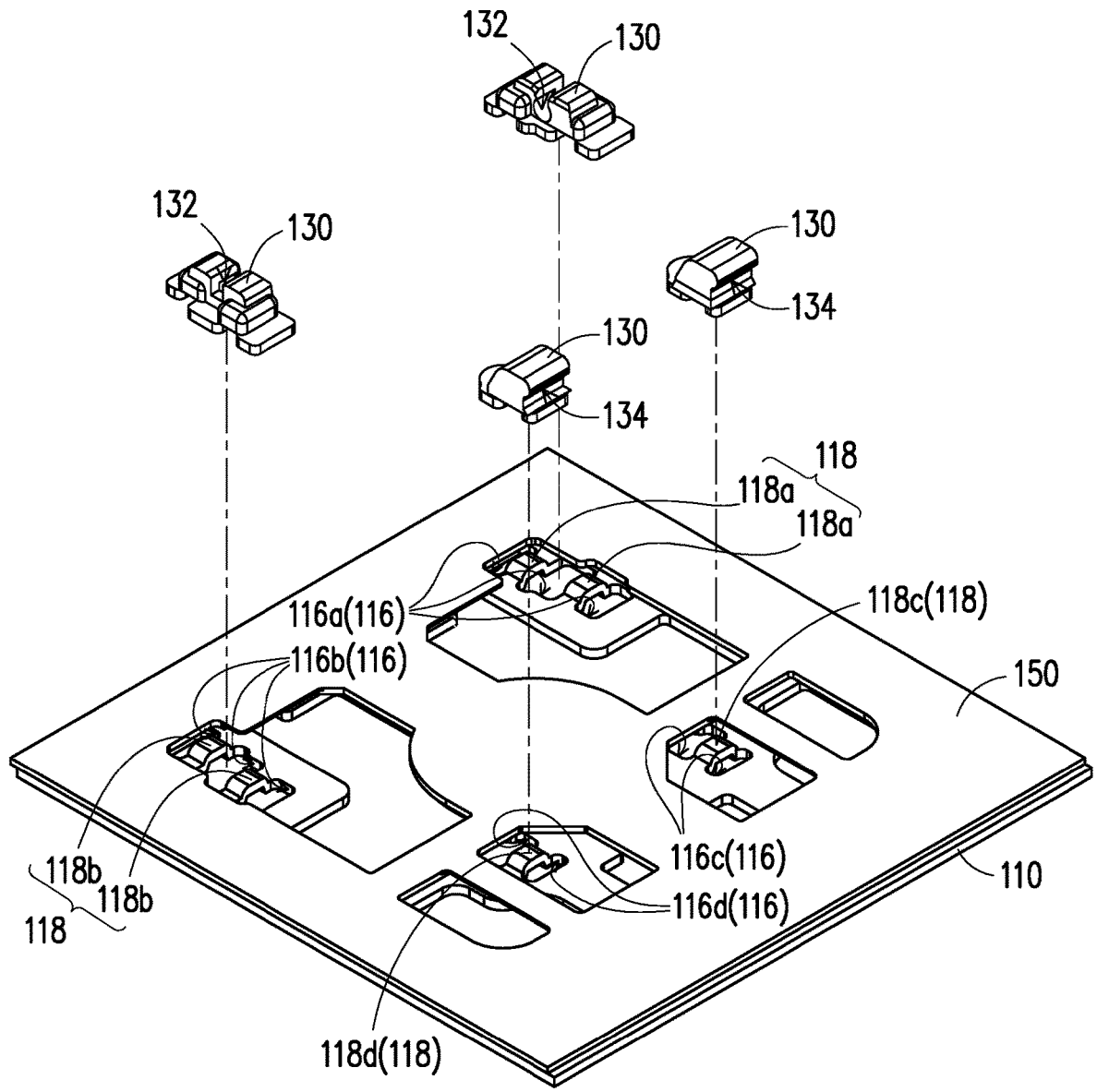
FIG. 3B is a partial exploded three-dimensional view in FIG. 3A.
Figure 4:
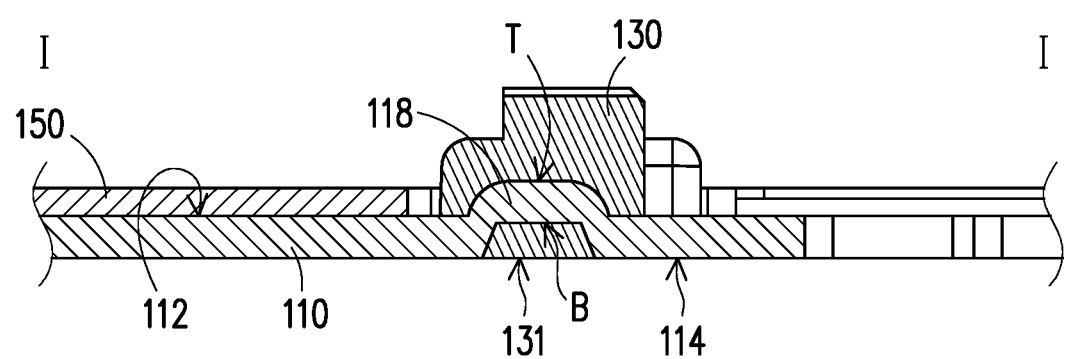
FIG. 4 is a schematic cross-sectional view in FIG. 3A along a line I-I.
Figure 5A:
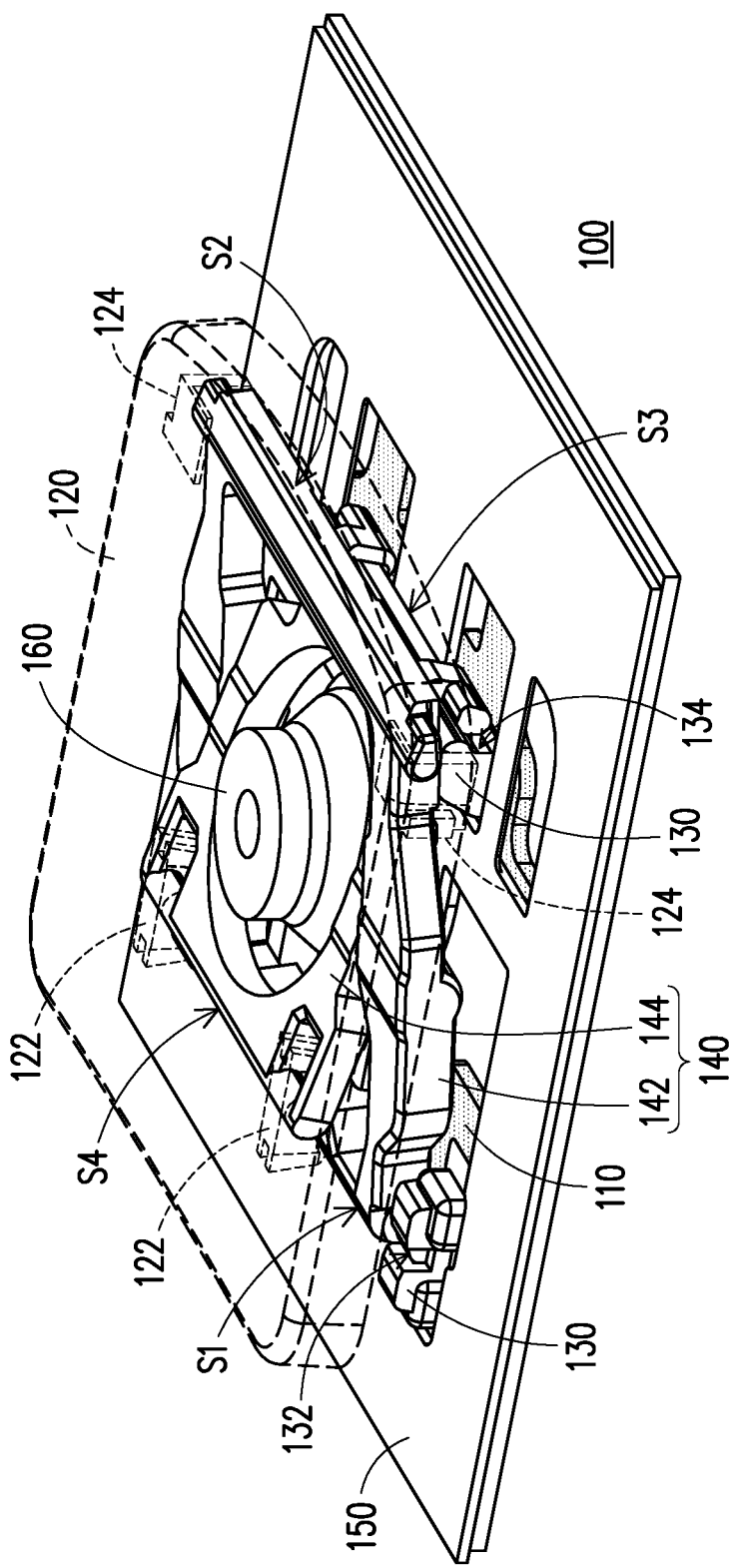
FIG. 5A is a schematic three-dimensional view of the key structure in FIG. 1.
Figure 5B:
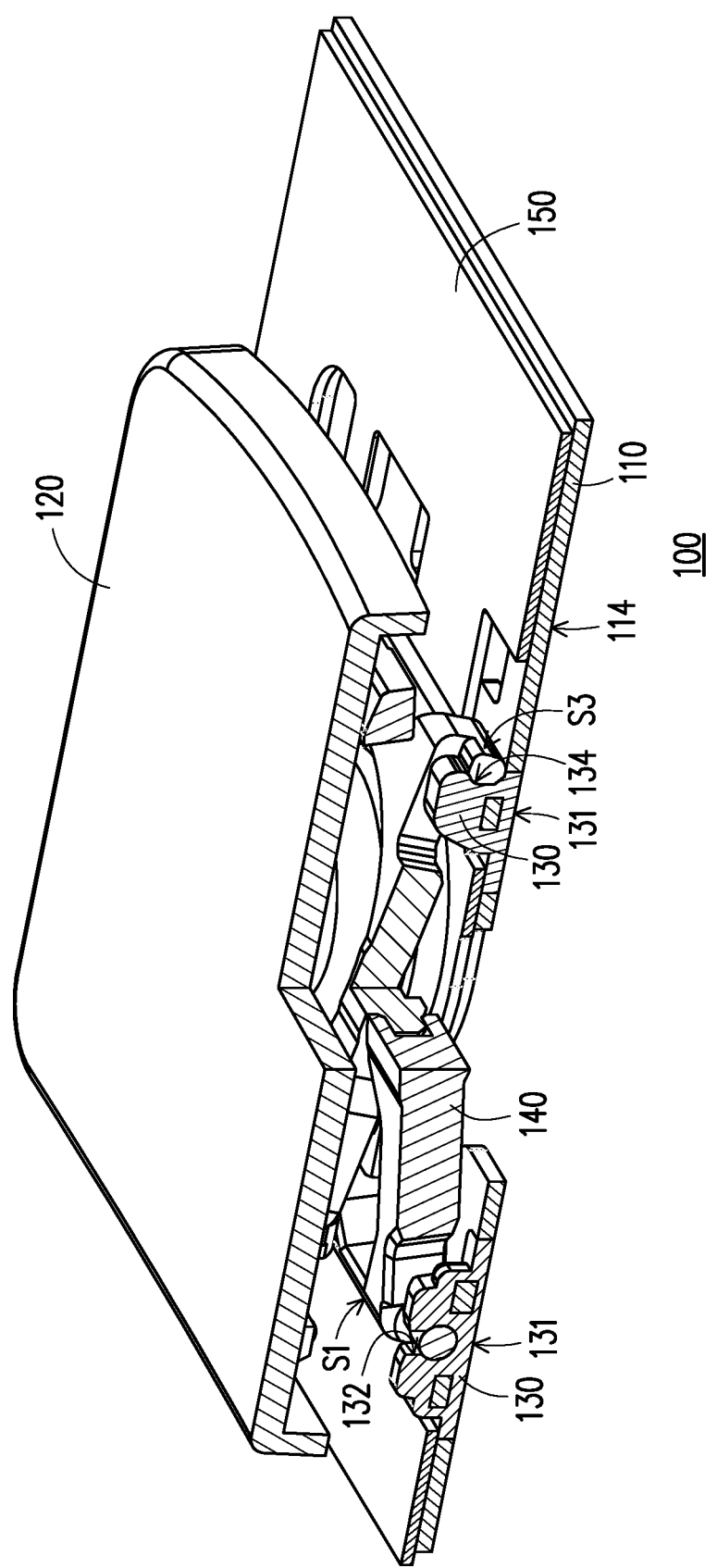
FIG. 5B is a schematic partial cross-sectional three-dimensional view in FIG. 5A.

FIG. 1 is a schematic top view of a key structure according to an embodiment of the disclosure. FIG. 2A is a schematic three-dimensional view of a base plate and a membrane circuit board of the key structure in FIG. 1. FIG. 2B is a schematic three-dimensional view of the base plate of the key structure in FIG. 2A. FIG. 3A is a schematic top view of the base plate, the membrane circuit board and engaging members of the key structure in FIG. 1. FIG. 3B is a partial exploded three-dimensional view in FIG. 3A. FIG. 4 is a schematic cross-sectional view in FIG. 3A along a line I-I. FIG. 5A is a schematic three-dimensional view of the key structure in FIG. 1. FIG. 5B is a schematic partial cross-sectional three-dimensional view in FIG. 5A. For simplicity's sake, a keycap in FIG. 1 is indicated by dotted lines.

Referring to FIG. 1, FIG. 5A and FIG. 5B, in the embodiment, a key structure 100 includes a keycap 120, a connection assembly 140, a plurality of engaging members 130, and a base plate 110. The keycap 120 is disposed above the base plate 110. The connection assembly 140 is disposed between the base plate 110 and the keycap 120, and is movably connected to the keycap 120 and the engaging members 130. The connection assembly 140 may be a scissor-like assembly, a wing-shaped assembly, or a supporting assembly driven by magnetic force, and the scissor-like assembly is taken as an example for elaborating the embodiment, but the disclosure is not limited thereto. Referring to FIG. 2A and FIG. 4 (a schematic cross-sectional view in FIG. 3A along the line I-I), the base plate 110 has an upper surface 112 and a lower surface 114 opposite to each other, and a plurality of openings 116. The base plate 110 is provided with a plurality of engaging protrusions 118 extended from the upper surface 112, respectively. Each of the engaging protrusions 118 is located between two openings 116, and the two openings 116 may communicate with each other through the corresponding engaging protrusion 118. Referring to FIG. 3B and FIG. 4, the engaging members 130 are respectively disposed on the corresponding openings 116 of the base plate 110. The engaging members 130 may be respectively disposed on the corresponding openings 116, fill the openings 116 and cover the engaging protrusions 118. In an embodiment, as shown in FIG. 4, the top and the bottom of the engaging protrusion 118 may be encapsulated in the engaging member 130.

In detail, as shown in FIG. 2A and FIG. 2B, the openings 116 of the base plate 110 includes three openings 116a and three openings 116b arranged side by side, and two openings 116c and two openings 116d arranged side by side. The three openings 116a (i.e., a first opening, a second opening and a third opening) communicate with each other through two engaging protrusions 118a (i.e., a first engaging protrusion and a second engaging protrusion). The first engaging protrusion is located between the first opening and the second opening, and the second engaging protrusion is located between the second opening and the third opening. It is noted that the two engaging protrusions 118a (i.e., the first engaging protrusion and the second engaging protrusion) are aligned with an axis L obliquely. In an embodiment, the engaging protrusions 118a are in an off-centered alignment. The first opening and the second opening communicate with each other via the accommodation under the first engaging protrusion, and the second opening and the third opening communicate with each other via the accommodation under the second engaging protrusion. Similarly, the three openings 116b (i.e., the first opening, the second opening, and the third opening) communicate with each other through the two engaging protrusions 118b (i.e., the first engaging protrusion and the second engaging protrusion). The first engaging protrusion is located between the first opening and the second opening, and the second engaging protrusion is located between the second opening and the third opening. The two engaging protrusions 118b (i.e., the first engaging protrusion and the second engaging protrusion) are obliquely aligned with, for example, a reference axis passing through the three openings 116b. In an embodiment, the engaging protrusions 118b are in an off-centered alignment. The three openings 116b communicate with each other through the two engaging protrusions 118b. In an embodiment, the first opening and the second opening communicate with each other via the accommodation under the first engaging protrusion, and the second opening and the third opening communicate with each other via the accommodation under the second engaging protrusion. Here, referring to FIG. 2A and FIG. 5A, the axis L in FIG. 2A is substantially perpendicular to a first side S1 of a first supporting member 142, or a fourth side S4 of a second supporting member 144 of the connection assembly 140 in FIG. 5A. Referring back to FIG. 2A and FIG. 2B, the two engaging protrusions 118a are obliquely aligned with the axis L, and the two engaging protrusions 118b may also be arranged in an analogous way, so that the bonding strength between the engaging members 130 and the base plate 110 may be further enhanced through the off-centered alignment of the engaging protrusions 118. The two openings 116c communicate with each other through one engaging protrusion 118c, and the two openings 116d communicate with each other through one engaging protrusion 118d. In an embodiment, a width of the engaging protrusion 118 may be smaller than a width of the adjacent opening 116, thereby increasing the bonding area between the engaging member 130 and the base plate 110 and improving the structural strength on account of the enlarged width of the opening 116. Regarding the openings 116a and 116b and the engaging protrusions 118a and 118b, a width of the first engaging protrusion is smaller than a width of the first opening or the second opening, and a width of the second engaging protrusion is smaller than a width of the second opening or the third opening. The widths of the above engaging protrusions and openings are, for example, the maximum widths thereof measured perpendicular to the axis L. Moreover, the openings 116c and 116d and the engaging protrusions 118c and 118d may be arranged in a similar configuration, e.g., a width of the engaging protrusion 118c is smaller than a width of any opening 116c, and a width of the engaging protrusion 118d is smaller than a width of any opening 116d.

As shown in FIG. 4, each engaging protrusion 118 has a top surface T and a bottom surface B opposite to each other. In a close up view of the engaging protrusion 118 in cross section, the contour of the bottom surface B of the engaging protrusion 118 is different from that of the top surface T. In an embodiment, one of the top surface T and the bottom surface B may have a beveled edge, a chamfered edge, or a rounded edge corresponding to the transition between the engaging protrusion 118 and the base plate 110. The cross-sectional profile of the top surface T is, for example, defined by a straight line and two rounded edges (or chamfers) connecting both ends of the straight line, and the cross-sectional profile of the bottom surface B is, for example but not limited thereto, defined by a straight line and two beveled edges connecting both ends of the straight line. In another embodiment, the cross-sectional shapes of the top surface T and the bottom surface B may be respectively defined by straight lines and rounded edges (or chamfers) connecting the respective ends of the straight lines, in which the rounded edge (or chamfer) of the bottom surface B is provided with the smaller angle than that of the top surface T, such that contours of the top surface T and the bottom surface B are not exactly the same. Here, a height of the engaging protrusion 118 is determined by material properties and a thickness of the base plate 110, where the base plate 110 is, for example, made of metal. Moreover, the engaging protrusion 118 in FIG. 4 may be shaped as an arch or a bridge (e.g., a continuous and uncracked arched or bridged structure), or may be shaped as a bridge with hole(s) (e.g., an arched or bridged structure with at least a hole formed therein or penetrating therethrough), or shaped as a divided arch or bridge with disconnected protrusions (e.g., a shape of an open bridge in an opened position) to accommodate plastic of the engaging member 130 and therefore enhance the bonding strength between the base plate 110 and the engaging member 130.

Referring to FIG. 5A and FIG. 5B, the connection assembly 140 includes a first supporting member 142 and a second supporting member 144 pivotally connected to each other, where the first supporting member 142 is located at an outer side of the second supporting member 144. In this exemplary embodiment, the first supporting member 142 surrounds the second supporting member 144, and the second supporting member 144 could fit within an aperture defined by the first supporting member 142. Namely, the first supporting member 142 and the second supporting member 144 are respectively known as an outer scissor member and an inner scissor member in the industry. The first supporting member 142 has a first side S1 and a second side S2 opposite to each other, and the second supporting member 144 has a third side S3 and a fourth side S4 opposite to each other. In addition, a second end of the first supporting member 142 (i.e., the second side S2) and a second end of the second supporting member 144 (i.e., the fourth side S4) are respectively connected to the keycap 120, and a first end of the first supporting member 142 (i.e., the first side S1) and a first end of the second supporting member 144 (i.e., the third side S3) are respectively connected to the engaging member 130.

Moreover, as shown in FIG. 4, the embodied engaging members 130 are implemented using plastic injection molding to cover the engaging protrusions 118 and fill the openings 116 (not shown in FIG. 4), thereby bonding the plastic engaging members 130 on the base plate 110. In an embodiment, the bottom surfaces 131 of the engaging members 130 are substantially aligned with the lower surface 114 of the base plate 110, that is, the bottom surfaces 131 and the lower surface 114 could be coplanar, so as to reduce the entire thickness of the key structure 100. Referring to FIG. 3B, the two engaging members 130 corresponding to the openings 116a and 116b (i.e., the first engaging member and the second engaging member) respectively cover the two engaging protrusions 118a and the two engaging protrusions 118b by injection molding, and two first engaging portions 132 could be formed concurrently in the same process. The two engaging members 130 corresponding to the openings 116c and 116d (i.e., the third engaging member and the fourth engaging member) respectively cover the engaging protrusion 118c and the engaging protrusion 118d by injection molding, and two second engaging portions 134 thereof are formed at the same time. The two engaging members 130 corresponding to the openings 116a and 116b respectively encapsulate the engaging protrusions 118a and the engaging protrusions 118b, and are provided with the respective first engaging portions 132; the two engaging members 130 corresponding to the openings 116c and 116d respectively encapsulate the engaging protrusion 118c and the engaging protrusion 118d, and are provided with the respective second engaging portions 134.

Referring to FIG. 3B, FIG. 5A and FIG. 5B, the connection assembly 140 may be pivotally connected to the two first engaging portions 132 and the two second engaging portions 134, respectively, so as to be engaged with the base plate 110 above the corresponding openings 116a, 116b, 116c, and 116d through the four engaging members 130 (i.e., the first, the second, the third and the fourth engaging members). In FIGS. 3B and 5B, the bottom surfaces 131 of the engaging members 130 (i.e., the first engaging member and the second engaging member) defining the first engaging portions 132 and the bottom surfaces 131 of the engaging members 130 (i.e., the third engaging member and the fourth engaging member) defining the second engaging portions 134 are substantially aligned with the lower surface 114 of the base plate 110. Here, the substantial alignment refers to that the two surfaces are exactly or approximately aligned in the same plane.

Referring to FIG. 5A again, one end of the connection assembly 140 is movably connected to the keycap 120, and the other end of the connection assembly 140 is movably connected to the engaging members 130, so that the keycap 120 may be moved up and down relative to the base plate 110 with the connection assembly 140 which moves in a scissor-like action. In the connection assembly 140, the first side S1 of the first supporting member 142 is at least rotatably or pivotally connected to the first engaging portion 132 joined to the base plate 110, and the second side S2 of the first supporting member 142 is at least slidably connected to a second positioning portion 124 of the keycap 120. In addition, the third side S3 of the second supporting member 144 is at least slidably connected to the second engaging portion 134 that is joined to the base plate 110, and the fourth side S4 of the second supporting member 144 is at least rotatably or pivotally connected to a first positioning portion 122 of the keycap 120. The first end of the first supporting member 142 may pivot at the two first engaging portions 132 that is fixed to the base plate 110, and the second end of the first supporting member 142 may pivot at the keycap 120. The first end of the second supporting member 144 may pivot at the two second engaging portions 134 that is fixed to the base plate 110, and the second end of the second supporting member 144 may pivot at the keycap 120. Accordingly, the first end of the first supporting member 142 of the connection assembly 140 may freely rotate within the retaining interface defined by the two first engaging portions 132 fixed to the base plate 110, and the first end of the second supporting member 144 may slide horizontally with a limited amount of movement within the retaining interface defined by the two second engaging portions 134 fixed to the base plate 110. The first engaging portion 132 and the second engaging portion 134 could be constructed in different forms, where the first engaging portion 132 is embodied as a retaining groove, and the second engaging portion 134 is embodied as a retaining hook, but the disclosure is not limited thereto. The first side S1 of the first supporting member 142 may be rotatably coupled to the first engaging portions 132, and the third side S3 of the second supporting member 144 may be coupled to the second engaging portions 134 with a limited amount of horizontal movement, so that the connection assembly 140 may support the keycap 120 to travel up and down.

Since the embodied engaging members 130 are implemented using injection-molded plastic, the engaging members 130 can take any suitable shape while enabling the first engaging portion 132 and the second engaging portion 134 to be pivotally connected to the connection assembly 140.

Moreover, referring to FIG. 5A and FIG. 5B, the key structure 100 of the embodiment further includes a membrane circuit board 150 disposed between the keycap 120 and the base plate 110. The membrane circuit board 150 has a plurality of through holes 152 (indicated in FIG. 2A), where the engaging members 130 and a part of the base plate 110 are exposed. In addition, referring to FIG. 5A, the key structure 100 of the embodiment further includes an elastic component 160 that passes through the connection assembly 140 and is disposed between the keycap 120 and the membrane circuit board 150. When a user presses down on the keycap 120, the elastic component 160 is deformed and depresses the membrane circuit board 150 to close a switch thereof. When the force of pressing down the keycap 120 is removed, the elastic component 160 could reset the keycap 120 upward to a relaxed state. The connection assembly 140 is used to enable the keycap 120 to stably travel with an up-and-down movement. The elastic component 160 is, for example, a rubber dome or a metal dome, which may support the keycap 120 and complete the electrical connection of the membrane circuit board 150 when the elastic component 160 is compressed.

In brief, the base plate 110 of the embodiment has the engaging protrusions 118 providing an increased contact area which could be occupied by the engaging members 130 constructed by plastic injection molding, and therefore the injection-molded engaging members 130 could be stably joined to the base plate 110 without compromising the thickness of the key structure 100. Namely, by using the design of the engaging protrusions 118 with an enlarged contact area for the engaging members 130, a connecting strength between the engaging members 130 and the base plate 110 may be enhanced, and the key structure could be suitable for a thin-profile keyboard as well. Thus, the engaging members 130 are more durable which would not tend to break down or detach from the base plate 110 with the pulling force exerted by the connection assembly 140, thereby improving the reliability and a service life of the key structure 100, so that the keyboard incorporating the embodied key structures could be lighter or more compact.

To sum up, in the key structure provided in one or more embodiments of the disclosure, the engaging protrusions are disposed on the upper surface of the base plate, and the engaging members fill and cover one or more engaging protrusions through injection molding. The engaging protrusions could be configured with the proper arrangement, number and shape to increase the contact area between the engaging members and the engaging protrusions, and thus, the connecting strength between the engaging members and the base plate is enhanced. As such, the engaging members pulled by the connection assembly are prevented from being disengaged from the base plate, thereby improving the reliability and lifetime of the key structure.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A key structure, comprising:
   a base plate, having an upper surface, a lower surface opposite to the upper surface, a first opening and a second opening, and comprising a first engaging protrusion and a second engaging protrusion that are respectively extended from the upper surface, wherein the first engaging protrusion is adjacent to the first opening, and the second engaging protrusion is adjacent to the second opening;
   a first engaging member, connecting the first engaging protrusion and the second engaging protrusion, and being coupled to a bottom surface of the first engaging protrusion and a bottom surface of the second engaging protrusion;
   a keycap, disposed above the base plate; and
   a connection assembly, disposed between the base plate and the keycap, wherein one end of the connection assembly is movably connected to the keycap, and the other end of the connection assembly is movably connected to the first engaging member, so that the keycap is adapted to move up and down relative to the base plate with the connection assembly.

2. The key structure according to claim 1, wherein the first opening and the second opening communicate with each other through the first engaging protrusion, the second opening and a third opening of the base plate communicate with each other through the second engaging protrusion, and the first engaging protrusion and the second engaging protrusion are obliquely aligned with an axis.

3. The key structure according to claim 2, wherein a bottom surface of the first engaging member is aligned with the lower surface of the base plate.

4. The key structure according to claim 3, further comprising:
   a second engaging member, a third engaging member, and a fourth engaging member, the base plate further having a plurality of openings and comprising a plurality of engaging protrusions, wherein the second engaging member covers at least two of the engaging protrusions through injection molding, the first engaging member and the second engaging member include two first engaging portions, the third engaging member and the fourth engaging member respectively cover one of the engaging protrusions through injection molding and include two second engaging portions, the connection assembly is pivotally connected to the two first engaging portions and the two second engaging portions respectively, and the second engaging member, the third engaging member, and the fourth engaging member are coupled to the corresponding openings of the base plate.

5. The key structure according to claim 3, further comprising:
   a second engaging member, a third engaging member, and a fourth engaging member, wherein the first engaging member and the second engaging member are respectively provided with two first engaging portions through injection molding, the third engaging member and the fourth engaging member are respectively provided with two second engaging portions through injection molding, the connection assembly comprises a first supporting member and a second supporting member pivotally connected with each other, the first supporting member is located at an outer side of the second supporting member, a first end of the first supporting member is pivotally connected to the two first engaging portions, a second end of the first supporting member is pivotally connected to the keycap, a first end of the second supporting member is pivotally connected to the two second engaging portions, a second end of the second supporting member is pivotally connected to the keycap, the first end of the first supporting member of the connection assembly is rotatably arranged within the two first engaging portions, and the first end of the second supporting member is slidably arranged within the two second engaging portions.

6. The key structure according to claim 4, wherein at least one of the first engaging portions is a retaining groove, and at least one of the second engaging portions is a retaining hook.

7. The key structure according to claim 1, further comprising:
   a membrane circuit board, disposed between the keycap and the base plate, wherein the membrane circuit board has a plurality of through holes exposing the first engaging member and a part of the base plate.

8. The key structure according to claim 7, further comprising:
   an elastic component, positioned within an aperture confined by the connection assembly and disposed between the keycap and the membrane circuit board.

9. A key structure, comprising:
   a base plate, having a plurality of openings, an upper surface, and a lower surface opposite to the upper surface, and comprising a plurality of engaging protrusions protruding from the upper surface, wherein each of the engaging protrusions is located between two of the openings, and the two openings communicate with each other through an accommodation under each of the engaging protrusions;
   a first engaging member, a second engaging member, a third engaging member, and a fourth engaging member, wherein the first engaging member and the second engaging member respectively cover at least two of the engaging protrusions through injection molding, and the third engaging member and the fourth engaging member respectively cover one of the engaging protrusions through injection molding;
   a keycap, disposed above the base plate; and
   a connection assembly, disposed between the base plate and the keycap and having a first supporting member and a second supporting member pivotally connected to each other, wherein the first supporting member is located at an outer side of the second supporting member, a first end of the first supporting member is pivotally connected to the first engaging member and the second engaging member, a second end of the first supporting member is pivotally connected to the keycap, a first end of the second supporting member is pivotally connected to the third engaging member and the fourth engaging member, and a second end of the second supporting member is pivotally connected to the keycap, so that the keycap is adapted to move up and down relative to the base plate with the connection assembly.

10. The key structure according to claim 9, wherein the at least two of the engaging protrusions respectively covered by the first engaging member and the second engaging member are obliquely aligned with an axis passing through the openings.

11. The key structure according to claim 10, wherein a bottom surface of each of the first engaging member, the second engaging member, the third engaging member, and the fourth engaging member is aligned with the lower surface of the base plate.

12. The key structure according to claim 11, wherein the first engaging member and the second engaging member respectively have first engaging portions, the third engaging member and the fourth engaging member respectively have second engaging portions, and the connection assembly is pivotally connected to the first engaging portions and the second engaging portions.

13. The key structure according to claim 12, wherein at least one of the first engaging portions is a retaining groove, at least one of the second engaging portions is a retaining hook, so that the first end of the first supporting member of the connection assembly is rotatably positioned in the retaining groove, and the first end of the second supporting member is slidably positioned in the retaining hook.

14. The key structure according to claim 9, wherein further comprising:
   a membrane circuit board, disposed between the keycap and the base plate, wherein the membrane circuit board has a plurality of through holes exposing the first engaging member, the second engaging member, the third engaging member, the fourth engaging member, and a part of the base plate; and
   an elastic component, passing through the connection assembly and disposed between the keycap and the membrane circuit board.

15. The key structure according to claim 9, wherein any one of the engaging protrusions has a top surface and a bottom surface opposite to each other, and a contour of the bottom surface is different from a contour of the top surface.

16. The key structure according to claim 9, wherein a shape of any one of the engaging protrusions comprises an arch-shaped structure, a bridge-shaped structure, an arch- or bridge-shaped structure with a hole, or a divided arch- or bridge-shaped structure with disconnected protrusions.

17. A key structure, comprising:
   a base plate, having an upper surface, a lower surface opposite to the upper surface, a first opening, and a second opening, and comprising a first engaging protrusion extended from the upper surface, wherein the first engaging protrusion is located between the first opening and the second opening, and a width of the first engaging protrusion is smaller than a width of the first opening or the second opening;
   a first engaging member, positioned in the first opening and the second opening, and covering a top surface and a bottom surface of the first engaging protrusion;
   a keycap, disposed above the base plate; and
   a connection assembly, disposed between the base plate and the keycap, wherein one end of the connection assembly is movably connected to the keycap, and the other end of the connection assembly is movably connected to the first engaging member.

18. The key structure according to claim 17, wherein the base plate further has a third opening and comprises a second engaging protrusion extended from the upper surface, wherein the second engaging protrusion is located between the second opening and the third opening, and the first engaging member is integrally positioned in the third opening and covers the second engaging protrusion.

19. The key structure according to claim 18, wherein the first engaging protrusion and the second engaging protrusion are in an off-centered alignment.

20. The key structure according to claim 17, wherein one of the top surface and the bottom surface of the first engaging protrusion comprises a beveled edge, a chamfered edge, or a rounded edge.

21. The key structure according to claim 17, wherein the first engaging member has a first engaging portion with a retaining interface for coupling the connection assembly.

22. The key structure according to claim 1, wherein the first engaging protrusion and the second engaging protrusion are spaced apart.

23. The key structure according to claim 1, wherein the first engaging member covers the first opening and the second opening.

24. The key structure according to claim 1, wherein the first engaging protrusion comprises an engaging portion having an opening to receive a part of the connection assembly.

* * * * *